(12) United States Patent
Mao et al.

(10) Patent No.: US 12,523,904 B2
(45) Date of Patent: Jan. 13, 2026

(54) PIXEL STRUCTURE AND DISPLAY PANEL

(71) Applicants: CHONGQING HKC OPTOELECTRONICS TECHNOLOGY CO., LTD., Chongqing (CN); HKC CORPORATION LIMITED, Shenzhen (CN)

(72) Inventors: Han Mao, Chongqing (CN); Haoxuan Zheng, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 471 days.

(21) Appl. No.: 18/077,578

(22) Filed: Dec. 8, 2022

(65) Prior Publication Data
US 2023/0288747 A1   Sep. 14, 2023

(30) Foreign Application Priority Data
Mar. 14, 2022   (CN) .......................... 202210245981.0

(51) Int. Cl.
*G02F 1/1335*   (2006.01)
*G02B 5/20*   (2006.01)

(52) U.S. Cl.
CPC ....... *G02F 1/133514* (2013.01); *G02B 5/201* (2013.01)

(58) Field of Classification Search
CPC .......................... G02F 1/133514; G02B 5/201
USPC .......................................................... 359/601
See application file for complete search history.

(56) References Cited

U.S. PATENT DOCUMENTS

2006/0103615 A1   5/2006  Shih et al.
2019/0363107 A1*  11/2019  Matsusaki ................ G02B 5/20

FOREIGN PATENT DOCUMENTS

| CN | 104238217 A |   | 12/2014 |   |   |
|---|---|---|---|---|---|
| CN | 104820312 A |   | 8/2015 |   |   |
| CN | 106935218 A | * | 7/2017 | ....... | G02F 1/134309 |
| WO | 2021127800 A1 |   | 7/2021 |   |   |

* cited by examiner

*Primary Examiner* — Michael H Caley
(74) *Attorney, Agent, or Firm* — Maier & Maier, PLLC

(57) ABSTRACT

A pixel structure and a display panel. The pixel structure includes a plurality of first pixel sets arranged in an array along a first direction and a second direction, each first pixel set includes at least three sub-pixels of different colors, and at least three of the sub-pixels are a red sub-pixel, a green sub-pixel and a blue sub-pixel. Between two adjacent first pixel sets, the red sub-pixel in one first pixel set and the blue sub-pixel in another first pixel sets arranged adjacent to this one in the first direction are arranged non-adjacent to each other, and the red sub-pixel and the blue sub-pixel in each first pixel set are arranged adjacent to each other. The display panel includes the above pixel structure.

14 Claims, 6 Drawing Sheets

PIXEL STRUCTURE AND DISPLAY PANEL

CROSS-REFERENCE TO RELATED APPLICATION

Pursuant to 35 U.S.C. § 119 and the Paris Convention, this application claims the benefit of Chinese Patent Application No. 202210245981.0 filed on Mar. 14, 2022, the content of which is incorporated herein by reference.

FIELD

The present application relates to the field of display technology, and in particular, to a pixel structure and a display panel.

BACKGROUND

The statements provided herein are merely background information related to the present application, and do not necessarily constitute any prior arts. The liquid crystal display (LCD) is constructed by placing a liquid crystal cassette in two parallel glass substrates. Thin-film transistors are arranged on a lower glass substrate, and the rotation direction of liquid crystal molecules can be controlled by changing the signal and voltage on the thin-film transistors, thereby achieving a control of the polarization of each pixel to achieve the purpose of display. The pixel structures of conventional LCDs are all designed in RGB arrangement, i.e., each set of pixels is constituted by a row of red (R) sub-pixels, a row of green (G) sub-pixels and a row of blue (B) sub-pixels as a first pixel set. When the R sub-pixels, G sub-pixels and B sub-pixels are all lit up, the screen is displayed in white on a macro level. When the R sub-pixels and B sub-pixels are all lit up, the screen is displayed in purple on the macro level. When the G sub-pixels and B sub-pixels are all lit up, the screen is displayed in cyan on the macro level. When all R and G sub-pixels are lit, the screen is displayed in yellow on the macro level.

In particular, when a purple screen needs to be displayed, the R sub-pixels and B sub-pixels in each row should all be lit up, theoretically making the R and B sub-pixels in each set to be color-superimposed as purple, whereas the R and B sub-pixels are arranged non-adjacent to each other, so the light mixing effect between each sub-pixel of the traditional RGB pixel structure arranged in parallel is not good, as a result, the macroscopic appearance of a purple screen is reddish in the 1-st set of the screen and is bluish in the n-th set of the screen, resulting in abnormal screens, and degraded display quality of screens.

SUMMARY

An objective of the embodiments of the present application is to provide a pixel structure, which, by arranging a red sub-pixel in one of the first pixel sets and the blue sub-pixel in another adjacent first pixel set being not adjacent to each other, and arranging the red sub-pixel the blue sub-pixel of each first pixel set being adjacent to each other, solves a problem that the existed pixel structure using RGB layout design has a poor mixing effect between the sub-pixels.

To achieve the above objective, an embodiment of the present application provides a pixel structure, which includes a plurality of first pixel sets arranged in an array along a first direction and a second direction, each first pixel set includes at least three sub-pixels of different colors, at least three of the sub-pixels are a red sub-pixel, a green sub-pixel and a blue sub-pixel, respectively. Between two adjacent first pixel sets, the red sub-pixel in one first pixel set and the blue sub-pixel in another first pixel set adjacent to this first pixel set in the first direction are arranged non-adjacent to each other. The red sub-pixel and the blue sub-pixel of each first pixel set are arranged adjacent to each other.

In an embodiment, each first pixel set includes the blue sub-pixel, the red sub-pixel and the green sub-pixel arranged in sequence along the first direction.

In an embodiment, each first pixel set includes the green sub-pixel, the red sub-pixel and the blue sub-pixel arranged in sequence along the first direction.

In an embodiment, the pixel structure includes n second pixel sets, a first supplementary sub-pixel, a second supplementary sub-pixel and a third supplementary sub-pixel. Each second pixel set includes at least three sub-pixels of different colors, at least three of the sub-pixels are respectively a red sub-pixel, a green sub-pixel and a blue sub-pixel arranged in sequence along the first direction.

The first supplementary sub-pixel is arranged on a side of a 1-st second pixel set away from a 2-nd second pixel set in the first direction.

The second supplementary sub-pixel is arranged on a side of a n-th second pixel set away from the (n−1)-th second pixel set in the first direction.

The third supplementary sub-pixel is arranged on a side of the second supplementary sub-pixel away from the n-th second pixel set in the first direction.

The first supplementary sub-pixel is a blue sub-pixel, and a 1-st first pixel set is constituted by the first supplementary sub-pixel as well as the red sub-pixel and the green sub-pixel in the 1-st second pixel set. The second supplementary sub-pixel is a red sub-pixel, the third supplementary sub-pixel is a green sub-pixel, and a (n+1)-th first pixel set is constituted by the second supplementary sub-pixel and the third supplementary sub-pixel as well as the blue sub-pixel in the n-th second pixel set.

In an embodiment, the n second pixel sets have the same width along the first direction and the plurality of first pixel sets have the same width along the first direction, each first pixel set has a width along the first direction being smaller than a width of each second pixel set along the first direction.

In an embodiment, the ratio of the width of each first pixel set along the first direction to the width of each second pixel set along the first direction is $n/(n+1)$.

In one embodiment, a width of the 1-st second pixel set along the first direction and a width of the n-th second pixel set along the first direction are respectively smaller than a width of each of other second pixel sets along the first direction. A sum of the width of the 1-st second pixel set along the first direction and a width of the first supplementary sub-pixel along the first direction is equal to the width of each of the other second pixel sets along the first direction. A sum of the width of the n-th second pixel set along the first direction and a width of the second supplementary sub-pixel along the first direction and a width of the third supplementary sub-pixel along the first direction is equal to the width of each of the other second pixel sets along the first direction.

In an embodiment, at least one of the red sub-pixel, the green sub-pixel and the blue sub-pixel in the 1-st second pixel set has a width along the first direction being smaller than a width of the red sub-pixel, the green sub-pixel or the blue sub-pixel in each of the other second pixel sets along the first direction.

In one embodiment, the red sub-pixel in the 1-st second pixel set has a width along the first direction being 0.25-0.75 times the width of the red sub-pixel, the green sub-pixel or the blue sub-pixel in each of the other second pixel sets along the first direction. The blue sub-pixel in the n-th the second pixel set has a width along the first direction being 0.25-0.75 times the width of the red sub-pixel, the green sub-pixel or the blue sub-pixel in each of the other second pixel sets along the first direction.

The present application also provides a display panel, which includes a first substrate, a second substrate and the pixel structure as described above. The first substrate is arranged opposite to the second substrate, the pixel structure is arranged between the first substrate and the second substrate.

Beneficial effects of the pixel structure provided by the present application is that, compared with the existing technologies, when a purple screen needs to be displayed, the red sub-pixel and the blue sub-pixel in each first pixel set 1 are all lit up, and since the red sub-pixel in one of the two adjacent first pixel sets is arranged non-adjacent to the blue sub-pixel in the other one of the two adjacent first pixel sets, then the human eye will not superimpose the red sub-pixel in the first one of the first pixel sets and the blue sub-pixel in the second one of the first pixel sets. Further, the red sub-pixel and the blue sub-pixel in each first pixel set are arranged adjacent to each other, so that the red sub-pixel and the blue sub-pixel in each first pixel set can be superimposed to form the color of purple, the whole screen is displayed in purple on a macro level, the reddish and bluish anomalies on the screen display are eliminated, and thus the display quality of the screen is improved.

BRIEF DESCRIPTION OF THE DRAWINGS

In order to illustrate the solutions in the embodiments of the present application more clearly, the following will briefly introduce the drawings that are required to be used in the description of embodiments or existing technologies. It will be apparent that the drawings described in here are only some embodiments of the present application, and for those of ordinary skill in the art, other drawings may also be obtained on the basis of these drawings without paying any creative labor.

DETAILED DESCRIPTION

Figure 1:
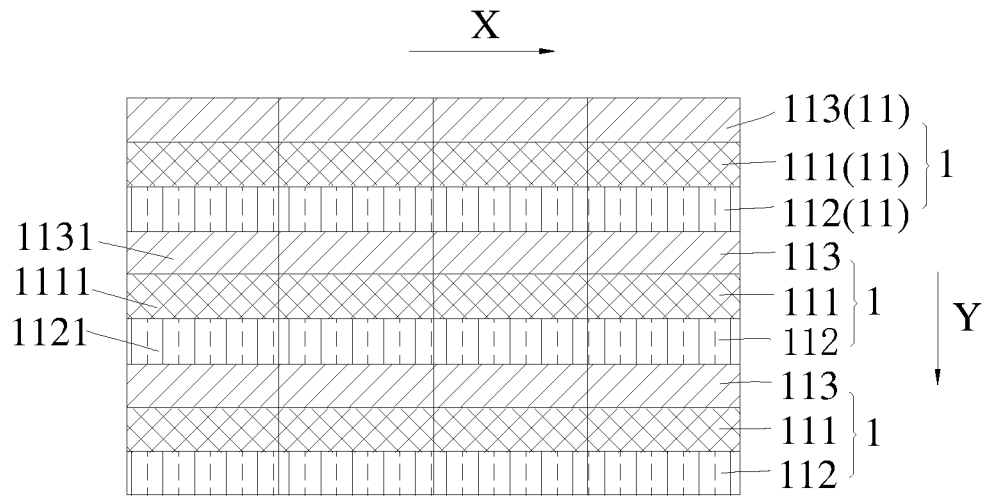
FIG. 1 a first schematic structural diagram of an arrangement of a pixel structure in accordance with an embodiment of the present application.

In order to make the objectives, solutions and beneficial effects of the present application more comprehensible, the present application will be further described in detail below with reference to the drawings and embodiments. It should be understood that specific embodiments described herein are only used to explain the present application, but not to limit the present application.

It should be noted that when an element is referred to as "fixed to" or "arranged on" another element, it may be directly or indirectly on that other element. When an element is referred to "connected" to another element, it may be directly or indirectly connected to that other element.

It should be understood that the orientation or positional relationships indicated by terms such as "length", "width", "up", "down", "front", "back", "left", "right", "vertical", "horizontal", "top", "bottom", "inside", "outside", etc. are based on the orientation or positional relationships shown in the drawings, which are intended only to facilitate and simplify the description of the present application, not to indicate or imply that the device or element referred to must have a particular orientation, be constructed or operated in a particular orientation, and are therefore not to be construed as limiting the present application.

In addition, the terms "first" and "second" are used for descriptive purposes only and are not to be understood as indicating or implying relative importance or as implicitly indicating the number of features indicated. Thus, a feature defined with "first" and "second" may explicitly or implicitly include one or more such features. In the description of the present application, the phrase "a/the plurality of" means two or more, unless otherwise expressly and specifically limited.

Referring to FIGS. 1, 5, 9 and 13, a pixel structure provided in an embodiment of the present application is illustrated. The pixel structure includes a plurality of first pixel sets 1 arrayed along a first direction Y as well as a second direction X. The first direction Y may be the column direction shown in the figures and the second direction X is the row direction shown in the figures.

In detail, each first pixel set 1 includes at least three sub-pixels 11 of different colors, the at least three sub-pixels 11 are respectively a red sub-pixel 111, a green sub-pixel 112 and a blue sub-pixel 113. Between two adjacent first pixel sets 1, the red sub-pixel 111 in one first pixel set 1 and the blue sub-pixel 113 in another first pixel set adjacent to this first pixel set in the first direction Y are arranged non-adjacent to each other, and the red sub-pixel 111 and the blue sub-pixel 113 in each first pixel set 1 are arranged adjacent to each other. In this embodiment, non-adjacent means that a sub-pixel 11 of other colors, such as a green sub-pixel 112, is arranged between the red sub-pixel 111 in one first pixel set 1 and the blue sub-pixel 113 in the other adjacent first pixel set 1. It will be appreciated that a plurality of other colored sub-pixels 11 may also be arranged.

It should be noted that the pixel structure in the relevant technology is arranged in an RGB arrangement such that when the R sub-pixels and B sub-pixels in each set are all lit up, this theoretically makes the R sub-pixel and B sub-pixel in a 1-st set to be superimposed as the 1-st set of purple, makes the R sub-pixel and B sub-pixel in a 2-nd set to be superimposed as the 2-nd set of purple, and makes the R sub-pixel and B sub-pixel in a n-th set to be superimposed as the n-th set of purple. Since the B sub-pixel in 1-st set and the R sub-pixel in the 2-nd set are located closer, and the B sub-pixel in the (n−1)-th set and the R sub-pixel in the n-th set are located closer, the human eye tends to superimpose colors of the sub-pixel sets that are located closer, so the human eye "incorrectly" superimposes the B sub-pixel in the first set and the R sub-pixel in the 2-nd set as purple, and superimpose the B sub-pixel in the (n−1)-th set and the R sub-pixel in the n-th set as purple. As a result, R sub-pixel in the 1-st set and B sub-pixels in the n-th set do not participate in color superposition, such that the screens that look purple on the macro level, tend to be red in the 1-st sets and tend to be blue in the n-th sets, resulting in abnormal screens and reduced display quality.

The pixel structure provided in the present application, compared with the existing technologies, when a purple screen needs to be displayed, the red sub-pixel 111 and the blue sub-pixel 113 in each first pixel set 1 are all lit up, and since the red sub-pixel 111 in one of the two adjacent first pixel sets 1 is arranged non-adjacent to the blue sub-pixel 113 in the other one of the two adjacent first pixel sets 1, then the human eye will not superimpose the red sub-pixel 111 in the first one of the two adjacent first pixel sets 1 and the blue sub-pixel 113 in the second one of the two adjacent first pixel sets 1. Furthermore, the red sub-pixel 111 and the blue sub-pixel 113 in each first pixel set 1 are arranged adjacent to each other, so that the red sub-pixel 111 and the blue sub-pixel 113 in each first pixel set 1 can be superimposed to form a purple color, the whole screen is displayed in purple on the macro level, the reddish and bluish anomalies on the screen display are eliminated, and thus the display quality of the screen is improved.

The following embodiments are provided based on different arrangements of pixel structure.

In an embodiment of the present application, referring to FIGS. 1 to 4. The display quality of the screen can be improved by changing the arrangement of the pixel structure in the liquid crystal display, specifically, the number of first pixel sets 1 is n, where n is a positive integer and n≥2, the sub-pixels 11 in the n first pixel sets 1 are arranged in the same sequence, and each first pixel group 1 includes a blue sub-pixel 113, a red sub-pixel 111 and a green sub-pixel 112 arranged in sequence along the first direction Y. The blue sub-pixels 113 include a plurality of blue sub-pixel cells 1131 arranged sequentially along the second direction X, the red sub-pixels 111 include a plurality of red sub-pixels cells 1111 arranged sequentially along the second direction X, and the green sub-pixels 112 include a plurality of green sub-pixel cells 1121 arranged sequentially along the second direction X.

Figure 2:
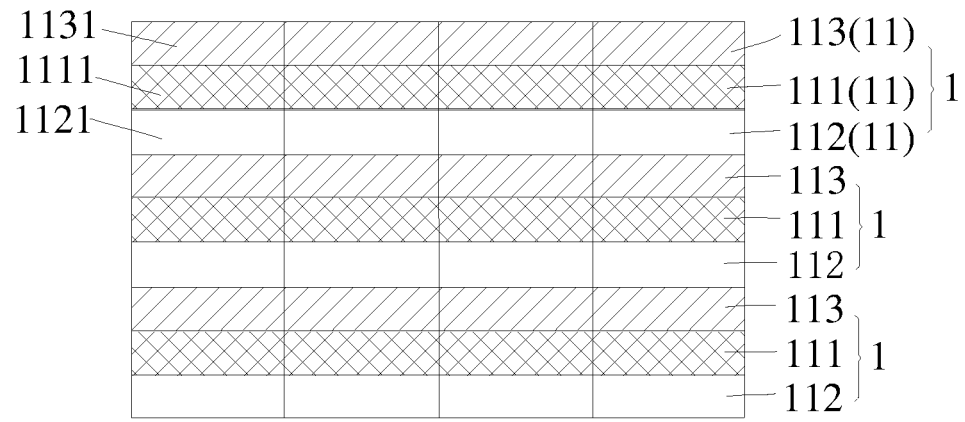
FIG. 2 a second schematic structural diagram of the arrangement of the pixel structure in accordance with an embodiment of the present application.

When a purple screen needs to be displayed, as shown in FIG. 2, the blue sub-pixel 113 and the red sub-pixel 111 in the 1-st first pixel set 1 are color-superimposed, and the blue sub-pixel 113 and the red sub-pixel 111 in the n-th first pixel set are color-superimposed. Since the blue sub-pixel 113 in the 1-st first pixel set 1 and the red sub-pixel 111 in the 2-nd first pixel set 1 are separated by the red sub-pixel 111, the green sub-pixel 112 and the blue sub-pixel 113, the human eye will not "mistakenly" superimpose the blue sub-pixel 113 in the 1-st first pixel set 1 and the red sub-pixel 111 in the 2-nd first pixel set 1. The whole screen is displayed in purple on the macro level, the reddish and bluish anomalies on the screen display are eliminated, and thus the quality of the display is improved. The above approach only changes the arrangement of the pixel structure and does not increase the space for extra sub-pixels 11. Therefore, the layout of IC output lines in the display panel does not need to change, only the timing of the IC output needs to be changed.

Figure 3:
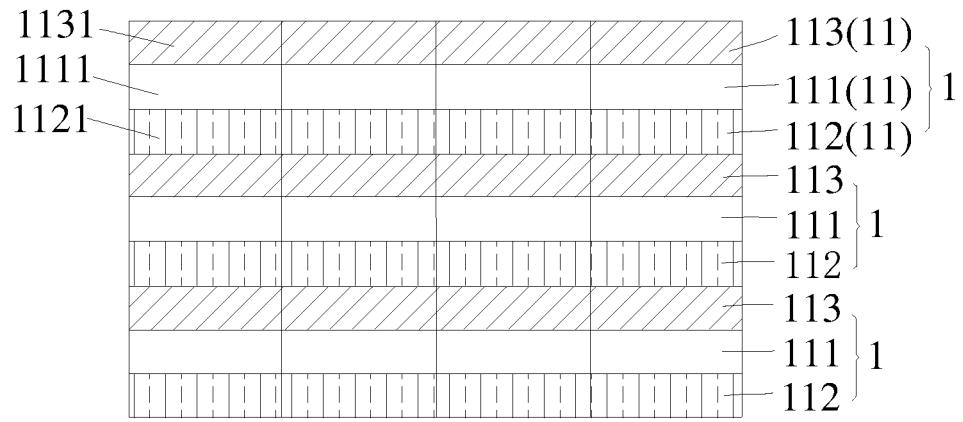
FIG. 3 a third schematic structural diagram of the arrangement of the pixel structure in accordance with an embodiment of the present application.

It should be noted that when a cyan screen needs to be displayed, further in conjunction with FIG. 3, the green sub-pixel 112 in the 1-st first pixel set 1 and the blue sub-pixel 113 in the 2-nd first pixel set 1 are color-superimposed; and the green sub-pixel 112 in the (n−1)-th first pixel set 1 and the blue sub-pixel 113 in the n-th first pixel set 1 are color-superimposed, which in turn results in that the difference in color between the blue sub-pixel 113 in the 1-st first pixel set 1 and the green sub-pixel 112 in the n-th first pixel set 1 and the cyan screen cannot be easily distinguished by the human eye.

Figure 4:
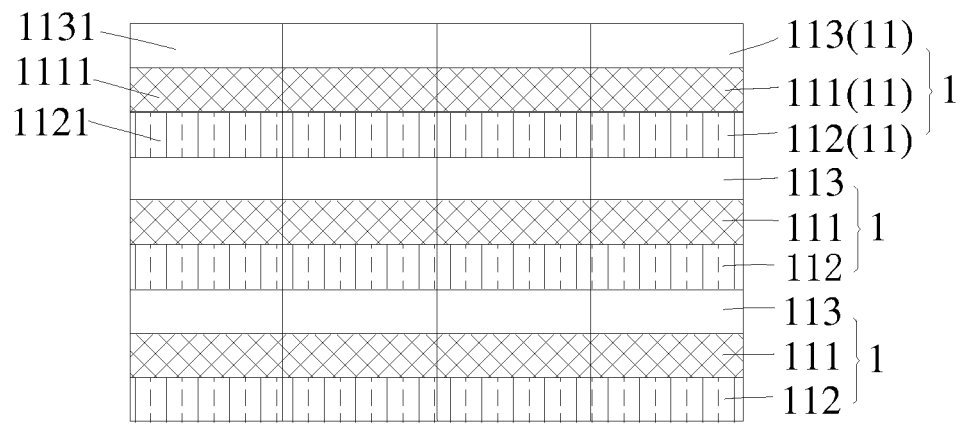
FIG. 4 a fourth schematic structural diagram of the arrangement of the pixel structure in accordance with an embodiment of the present application.

When a yellow screen needs to be displayed, further in conjunction with FIG. 4, the red sub-pixel 111 in the 1-st first pixel set 1 and the green sub-pixel 112 in the 1-st first pixel set 1 are color superimposed, and the red sub-pixel 111 in the n-th first pixel set 1 and the green sub-pixel 112 in the n-th first pixel set 1 are color superimposed, thus the whole screen is macroscopically displayed in yellow.

In an embodiment of the present application, referring to FIGS. 5 to 8, the number of first pixel sets 1 is n, where n is a positive integer and n≥2, and the sub-pixels 11 in the n first pixel sets 1 are arranged in the same sequence, the difference from the above embodiment is that each first pixel set 1 includes a green sub-pixel 112, a red sub-pixel 111 and a blue sub-pixel 113 arranged in sequence along the first direction Y. The green sub-pixel 112 includes a plurality of green sub-pixel cells 1121 arranged sequentially along the second direction X, the red sub-pixel 111 includes a plurality of red sub-pixel cells 1111 arranged sequentially along the second direction X, and the blue sub-pixel 113 includes a plurality of blue sub-pixel cells 1131 arranged sequentially along the second direction X.

Figure 6:
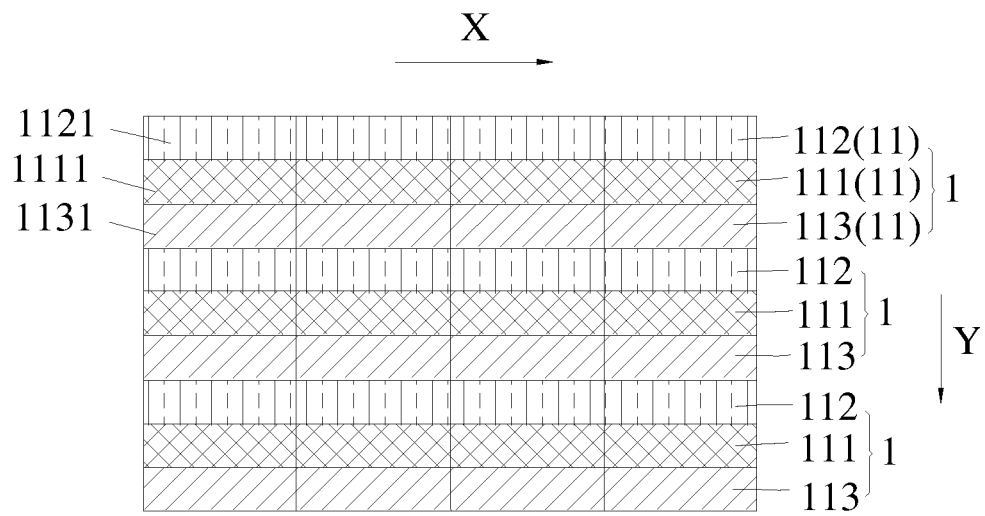
FIG. 6 a second schematic structural diagram of the arrangement of the pixel structure in accordance with another embodiment of the present application.

When a purple screen is displayed, as shown in FIG. 6, the red sub-pixel 111 and the blue sub-pixel 113 in the 1-st first pixel set 1 are color-superimposed, and the red sub-pixel 111 and the blue sub-pixel 113 in the n-th first pixel set 1 are color-superimposed. Since the red sub-pixel 111 in the 1-st first pixel set 1 and the blue sub-pixel 113 in the 2-nd first pixel set 1 are separated by the blue sub-pixel 113, the green sub-pixel 112 and the red sub-pixel 111, the human eye will not "mistakenly" superimpose the red sub-pixel 113 in the 1-st first pixel set 1 and the blue sub-pixel 111 in the 2-nd first pixel set 1. The whole screen is displayed in purple on the macro level, the reddish and bluish anomalies on the screen display are eliminated, and thus the quality of the display is improved. The above approach only changes the arrangement of the pixel structure and does not increase the space for extra sub-pixels 11, that is, the layout of IC output lines in the display panel does not need to change, only the timing of the IC output needs to be changed.

Figure 7:
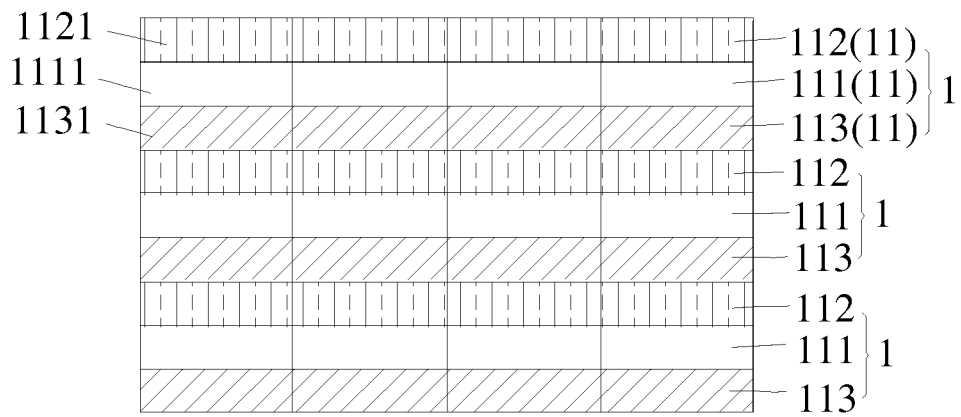
FIG. 7 a third schematic structural diagram of the arrangement of the pixel structure—in accordance with another embodiment of the present application.

It should be noted that when a cyan screen needs to be displayed, further in conjunction with FIG. 7, the blue sub-pixel 113 in the 1-st first pixel set 1 and the green sub-pixel 112 in the 2-nd first pixel set 1 are color-superimposed, the blue sub-pixel 113 in the (n−1)-th first pixel set 1 and the green sub-pixel in the n-th first pixel set 1 are color-superimposed. The green sub-pixel 112 in the 1-st first pixel set 1 and the blue sub-pixel 113 in the n-th first pixel set are not easily distinguishable from the cyan screen by the human eye, and the whole screen is macroscopically displayed in cyan.

Figure 8:
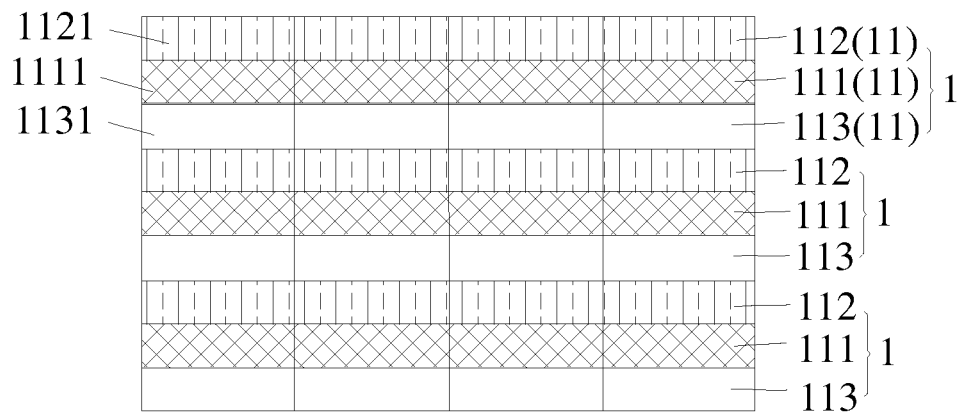
FIG. 8 a fourth schematic structural diagram of the arrangement of the pixel structure—in accordance with another embodiment of the present application.

When the yellow screen is displayed, further in conjunction with FIG. 8, the green sub-pixel 112 in the 1-st first pixel set 1 and the red sub-pixel 111 in the 1-st first pixel set 1 are color-superimposed, and the green sub-pixel 112 in the n-th first pixel set 1 and the red sub-pixel 111 in the n-th first pixel set 1 are color-superimposed, and the whole screen is macroscopically displayed in yellow.

In an embodiment of the present application, referring to FIGS. 9 to 12, the difference from the above embodiments is that the exited RGB arrangement is still remained in this embodiment, and the display quality is improved by adding sub-pixels 11. In this embodiment, the pixel structure includes n second pixel sets 114, each second pixel set 114 includes at least three sub-pixels 11 of different colors. The at least three sub-pixels 11 may be a red sub-pixel 111, a green sub-pixel 112 and a blue sub-pixel 113 arranged sequentially along the first direction Y, i.e., each second pixel set 114 includes a red sub-pixel 111, a green sub-pixel 112 and a blue sub-pixel 113 arranged sequentially along the first direction Y.

Further, the pixel structure includes a first supplementary sub-pixel 2, a second supplementary sub-pixel 3 and a third supplementary sub-pixel 4. The first supplementary sub-pixel 2 is arranged on a side of the 1-st second pixel set 114 away from the 2-nd second pixel set 114 in the first direction Y. The second supplementary sub-pixel 3 is arranged on a side of the n-th second pixel set 114 away from the (n−1)-th second pixel set 114 in the first direction Y. The third supplementary sub-pixel 4 is arranged on a side of the second supplementary sub-pixel 3 away from the n-th second pixel set 114 in the first direction Y. The first supplementary sub-pixel 2 is a blue sub-pixel 113. The first supplementary sub-pixel 2 as well as the red sub-pixel 111 and the green sub-pixel 112 in the 1-st second pixel set 114 form the 1-st first pixel set 1. The second supplementary sub-pixel 3 is a red sub-pixel 111 and the third supplementary sub-pixel 4 is a green sub-pixel 112. The second supplementary sub-pixel 3 and the third supplementary sub-pixel 4 together with the blue sub-pixel 113 of the n-th pixel set 114 form the (n+1)-th first pixel set 1, thus allowing the formation of (n+1) sets of pixels arranged in a GRB.

Figure 10:
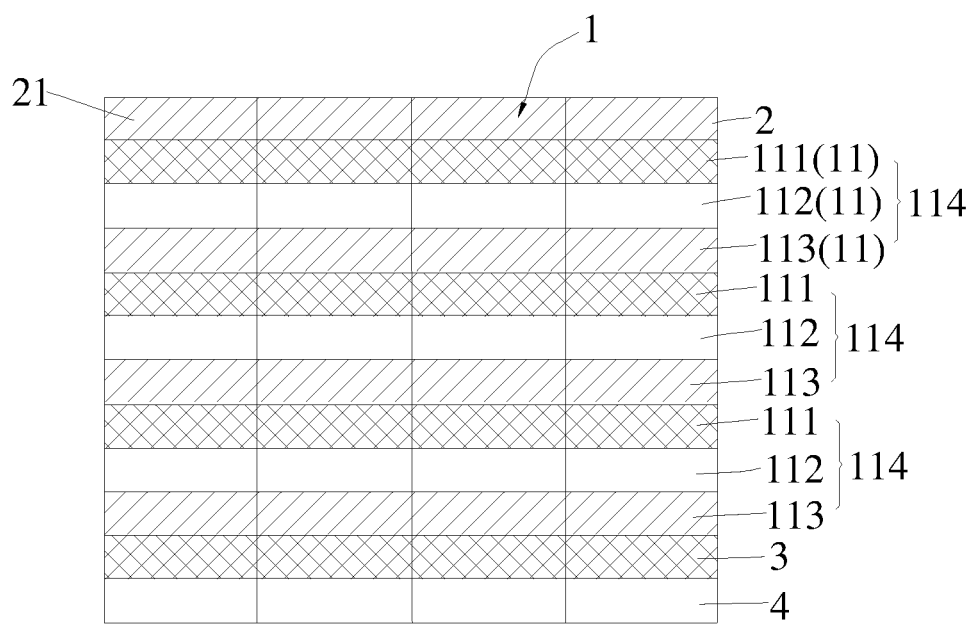
FIG. 10 a second schematic structural diagram of the arrangement of the pixel structure in accordance with yet another embodiment of the present application.

When a purple screen is displayed, referring to FIG. 10, the red sub-pixel 111 in the 1-st second pixel set 114 and the first supplementary sub-pixel 2 are color-superimposed, and the blue sub-pixel 113 in the n-th second pixel set 114 and the second supplementary sub-pixel 3 are color-superimposed. The whole screen is macroscopically displayed in purple, the reddish and bluish anomalies on screen display are eliminated, and the quality of the screen display is improved, as in the current display industry, the signal output of the ICs are all executed based on the RGB arrangement, this embodiment, by adding sub-pixels, only need to increase connection lines for the sub-pixels, without developing a new IC driver, which is a simple structure, easy to operate.

Figure 11:
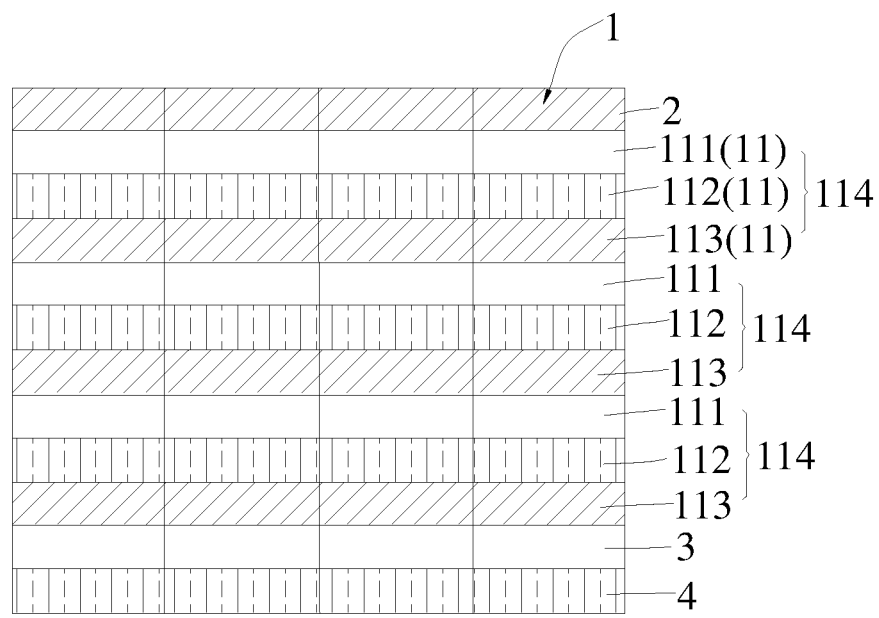
FIG. 11 a third schematic structural diagram of the arrangement of the pixel structure in accordance with yet another embodiment of the present application.

It should be noted that, referring to FIG. 11, when a cyan screen needs to be displayed, the green sub-pixel 112 in the 1-st second pixel set 114 and the blue sub-pixel 113 in the 2-nd second pixel set 114 are color-superimposed, the green sub-pixel 112 in the n-th second pixel set and the second supplementary sub-pixel 3 are color-superimposed as cyan. The difference in color-between the first supplementary sub-pixel 2 and the third supplementary sub-pixel 4 and the cyan screen cannot be distinguished by the human eye, and the whole screen is displayed in cyan on the macro level.

Figure 12:
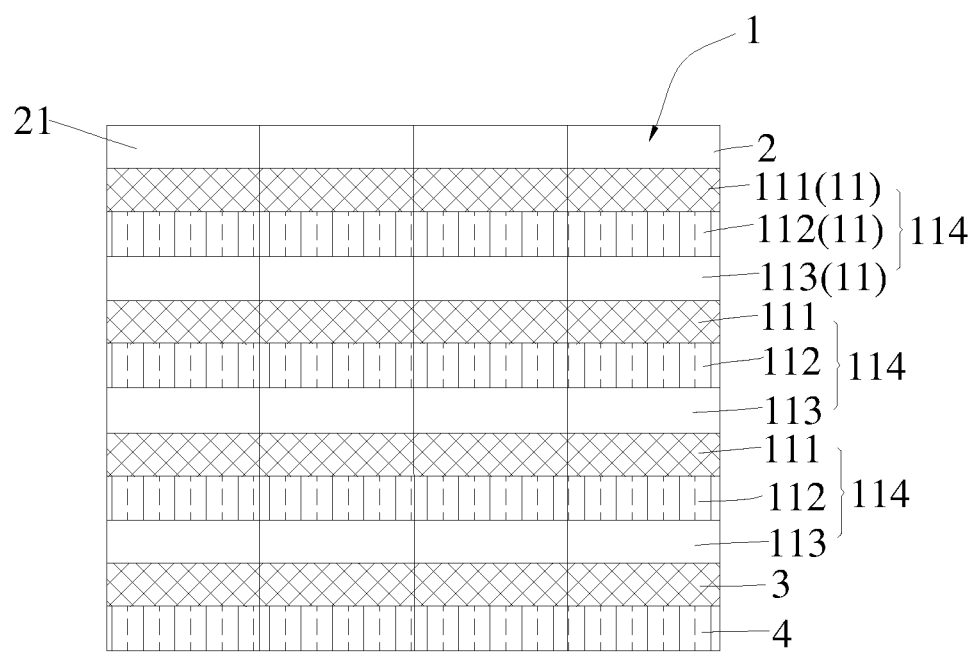
FIG. 12 a fourth schematic structural diagram of the arrangement of the pixel structure in accordance with yet another embodiment of the present application.

When a yellow screen needs to be displayed, referring to FIG. 12, the red sub-pixel 111 and the green sub-pixel 112 in the 1-st second pixel set 114 are color-superimposed, and the second supplementary sub-pixel 3 and the third supplementary sub-pixel 4 are color-superimposed, and the whole screen is macroscopically displayed in yellow.

Figure 9:
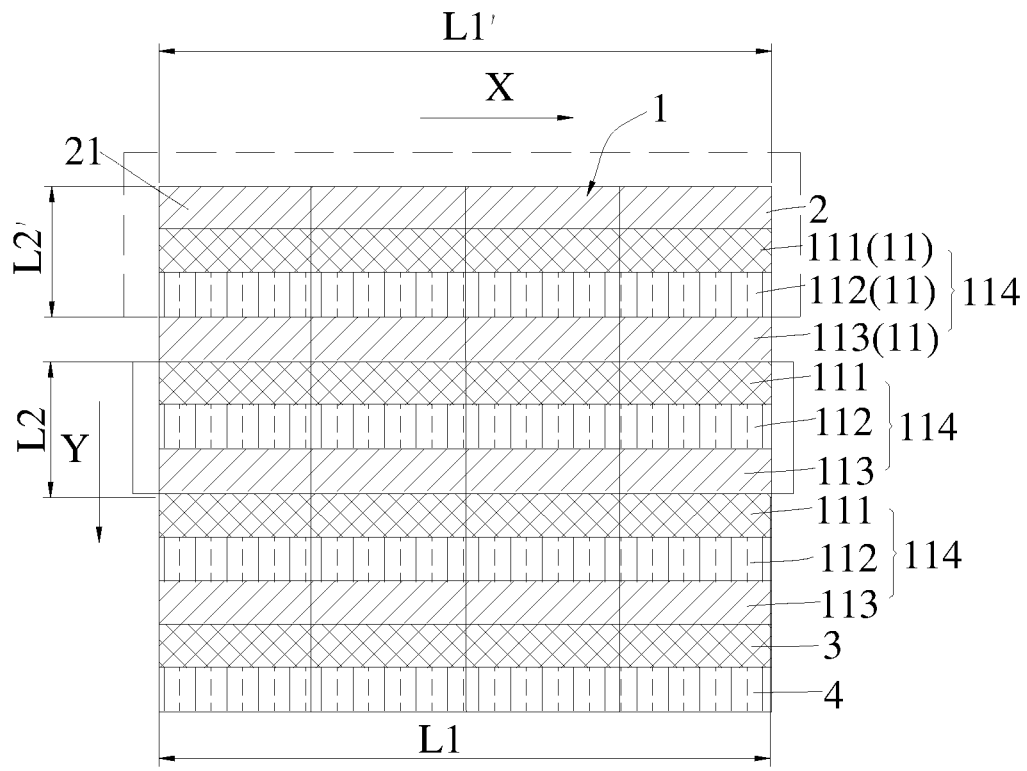
FIG. 9 a first schematic structural diagram of an arrangement of the pixel structure in accordance with yet another embodiment of the present application.

In an embodiment of the present application, referring to FIG. 9, since the addition of sub-pixels 11 leads to an increase in the effective display area, the width L2 of each second pixel set 114 along the first direction Y may be proportionally reduced in order to keep the effective display area unchanged, thus the optical characteristics being not affected can be achieved. Specifically, the width L2 of each second pixel set 114 along the first direction Y is the same, and the length L1 of each second pixel set 114 along the second direction X is the same, and the effective display area of n second pixel sets 114 satisfies the formula: $S=n*L1*L2$, where S is the effective display area of n second pixel sets 114, L1 is the length of each second pixel set 114 along the second direction X, L2 is the width of each second pixel set 114 along the first direction Y. The effective display area refers to the display area of the display panel.

Further, when the first supplementary sub-pixel 2, the second supplementary sub-pixel 3 and the third supplementary sub-pixel 4 are added, the width L2' of each first pixel set 1 along the first direction Y is the same; the length L1' of each first pixel set 1 along the second direction X is the same and is equal to the length L1 of each second pixel set 114 along the second direction, and the width L2' of each first pixel set 1 along the first direction Y is arranged to be smaller than the width L2 of each second pixel set 114 along the first direction Y, that is, the width L2 of each second pixel set 114 along the first direction Y is proportionally reduced, then the effective display area of the (n+1) first pixel sets 1 satisfies the formula: $S'=(n+1)*L1'*L2'$, where S' is the effective display area of the (n+1) first pixel sets 1, L1' is the length of each first pixel set 1 along the second direction X, and L2' is the length of each first pixel set 1 along the second direction X.

Figure 5:
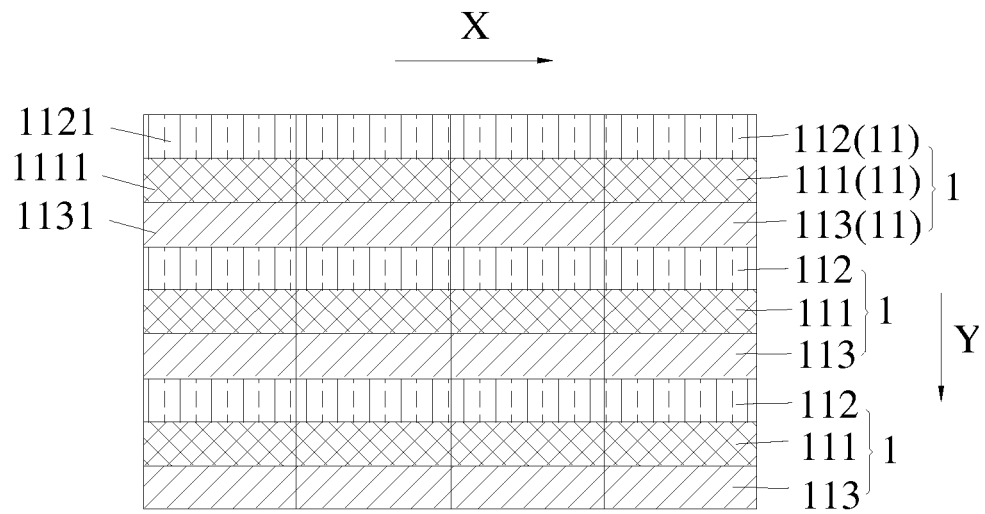
FIG. 5 a first schematic structural diagram of an arrangement of the pixel structure in accordance with another embodiment of the present application.

Further, referring to FIG. 5, to ensure that the effective display area remains unchanged, even if S'=S and L1'=L1, in case that $(n+1)*L1'*L2'=n*L1*L2$, then it is determined that $L2'=n*L2/(n+1)$, so that the ratio of the width L2' of the first pixel set 1 along the first direction Y to the width L2 of each second pixel set 114 along the first direction Y is n/(n+1), i.e., the width L2 of each second pixel set 114 along the first direction Y is reduced in equal proportion, thereby ensuring that the effective display area remains unchanged while the display quality is improved.

Figure 13:
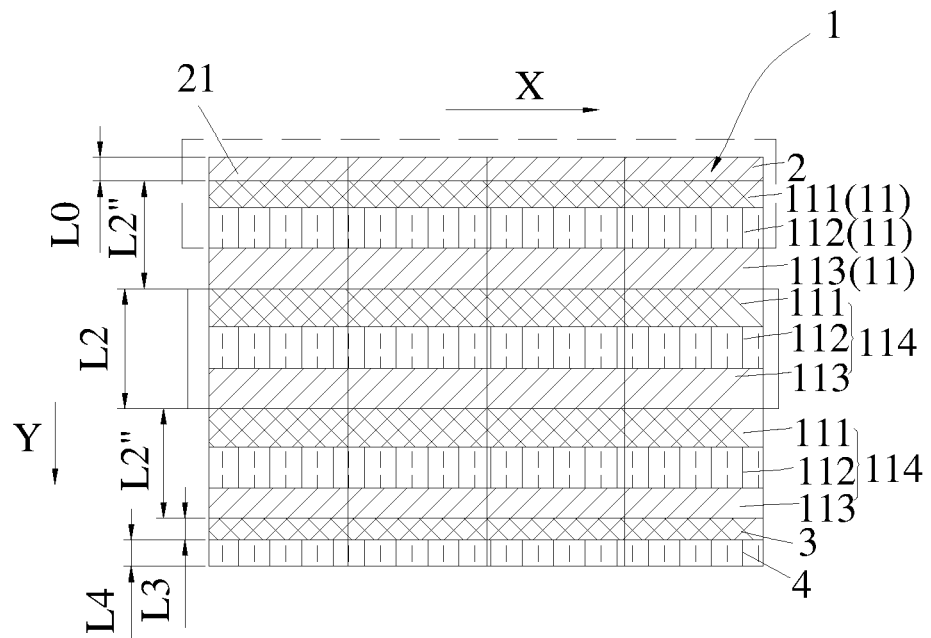
FIG. 13 a schematic structural diagram of an arrangement of the pixel structure in accordance with further anther embodiment of the present application.

In another embodiment of the present application, referring to FIG. 1 and FIG. 13, the difference from the above embodiments is that the width L2″ of the 1-st second pixel set 114 along the first direction Y and the width L2″ of the n-th second pixel set 114 along the first direction Y are reduced while the width L2 of each of the other second pixel sets 114 along the first direction Y remains unchanged. That is, the width L2" of the 1-st second pixel set 114 along the first direction Y and the width L2" of the n-th second pixel set 114 along the first direction Y are arranged to be smaller than the width L2 of each of other second pixel sets 114 along the first direction Y, respectively.

Further, the sum of the width L2" of the 1-st second pixel set 114 along the first direction Y and the width L0 of the first supplementary sub-pixel 114 along the first direction Y is equal to the width L2 of each of the other second pixel sets 114 along the first direction Y. The sum of the width L2" of the n-th second pixel set 114 along the first direction Y, the width L3 of the second supplementary sub-pixel 3 along the first direction Y, and the width L4 of the third supplementary sub-pixel 4 along the first direction Y is equal to the width L2 of each of the other second pixel sets 114 along the second direction Y, so that the effective display area is guaranteed to be constant.

In an embodiment of the present application, the width of at least one of the red sub-pixel 111, green sub-pixel 112 and blue sub-pixel 113 in the 1-st second pixel set 114 along the first direction Y is smaller than the width of the red sub-pixel 111, the green sub-pixel 112 or the blue sub-pixel 113 in each of the other second pixel sets 114 along the first direction Y. The red sub-pixel 111, green sub-pixel 112, and blue sub-pixel 113 in each second pixel set 114 have the same width along the first direction Y.

In this embodiment, several cases may be included. In a first case, the width of the red sub-pixel 111 in the 1-st second pixel set 114 along the first direction Y is smaller than the width of the red sub-pixel 111, green sub-pixel 112 or blue sub-pixel 113 in each of the other second pixel sets 114 along the first direction Y. Or alternatively, the width of the green sub-pixel 112 in the 1-st second pixel set 114 along the first direction Y is smaller than the width of the red sub-pixel 111, green sub-pixel 112 or blue sub-pixel 113 in each of the other second pixel sets 114 along the first direction Y. Or alternatively, the width of the blue sub-pixel 113 in the 1-st second pixel set 114 along the first direction Y is smaller than the width of the red sub-pixel 111, green sub-pixel 112 or blue sub-pixel 113 in each of the other second pixel sets 114 along the first direction Y.

In a second case, the widths of the red sub-pixel 111 and the green sub-pixel 112 in the 1-st second pixel set 114 along the first direction Y are respectively smaller than the width of the red sub-pixel 111, green sub-pixel 112 or blue sub-pixel 113 in each of the other second pixel sets 114 along the first direction Y. Or alternatively, the widths of the red sub-pixel 111 and the blue sub-pixel 113 in the 1-st second pixel set 114 are respectively smaller than the width of the red sub-pixel 111, green sub-pixel 112 or blue sub-pixel 113 in each of the other second pixel sets 114 along the first direction Y. Or alternatively, the widths of the green sub-pixel 112 and blue sub-pixel 113 in the 1-st second pixel set 114 along the first direction are respectively smaller than the width of the red sub-pixel 111, green sub-pixel 112 or blue sub-pixel 113 in each of the other second pixel sets 114 along the first direction Y.

In a third case the width of the red sub-pixel 111, the green sub-pixel 112 and the blue sub-pixel 113 in the 1-st second pixel set 114 along the first direction Y are all smaller than the width of the red sub-pixel 111, green sub-pixel 112 or blue sub-pixel 113 in each of the other second pixel sets 114 along the first direction Y.

Further, the width of the red sub-pixel 111 in the 1-st second pixel set 114 along the first direction Y is 0.25-0.75 times the width of the red sub-pixel 111, green sub-pixel 112 or blue sub-pixel 113 in each of the other second pixel sets 114 along the first direction Y; and the width of the blue sub-pixel 113 in the n-th second pixel set 114 along the first direction Y is set is 0.25-0.75 times the width of the red sub-pixel 111, green sub-pixel 112 or blue sub-pixel 113 in each of the other second pixel sets 114 along the first direction Y, the improvement is most obvious and has no effect on the optical characteristics of the display panel, avoiding that when it is too small or too large, the improvement is not obvious and the effective gain is not large.

Figure 14:
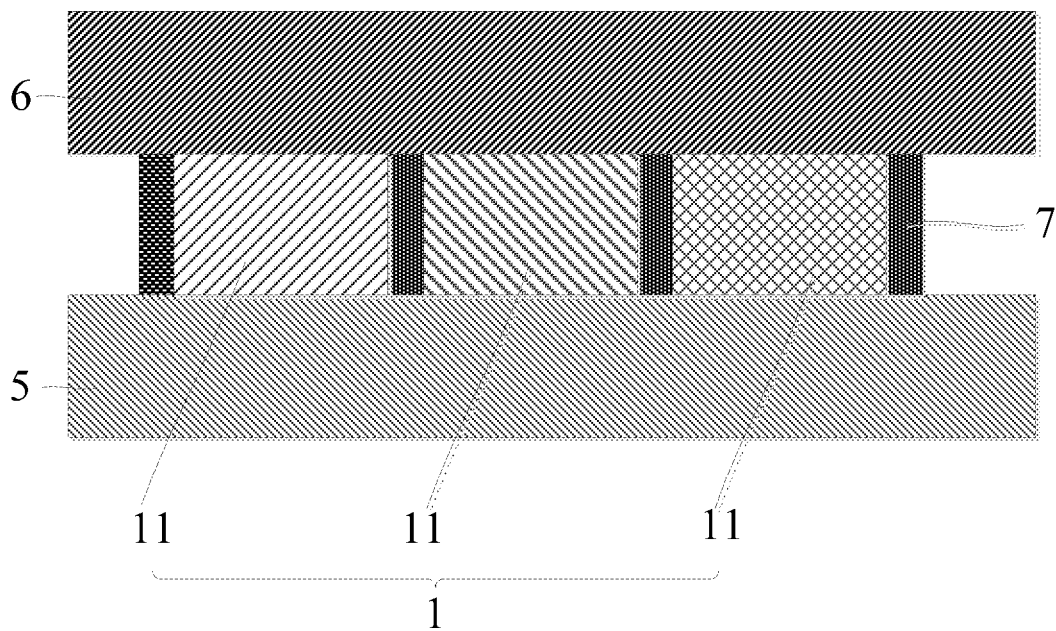
FIG. 14 is a schematic structural diagram of a display panel provided by an embodiment of the present application.

The present application also provides a display panel, referring to FIG. 14, the display panel includes a first substrate 5, a second substrate 6 and the pixel structure in any of the above embodiments. The first substrate 5 and the second substrate 6 are arranged opposite to each other, and the pixel structure is arranged in an array between the first substrate 5 and the second substrate 6.

In the display panel provided in the present application, the above-mentioned pixel structure is applied, whereby the problem of reddish and bluish in purple screen is eliminated and thus the display quality of the screen is improved.

In an embodiment of the present application, the display panel also includes black matrices 7, and the black matrices 7 are arranged between adjacent sub-pixels 11.

Any modifications, equivalent substitutions and improvements made within the spirit and principles of the present application shall be included within the protection scope of the present application.

What is claimed is:

1. A pixel structure, comprising:
a plurality of first pixel sets arranged in an array along a first direction and a second direction, each of the plurality of first pixel sets comprising at least three sub-pixels of different colors, and at least three of the sub-pixels being a red sub-pixel, a green sub-pixel and a blue sub-pixel, respectively,
wherein between two adjacent first pixel sets, the red sub-pixel in one first pixel set and the blue sub-pixel in another first pixel set adjacent to this first pixel set along the first direction are arranged non-adjacent to each other, and wherein the red sub-pixel and the blue sub-pixel in each first pixel set are arranged adjacent to each other,
wherein the pixel structure comprises:
n second pixel sets, each of the n second pixel sets comprising at least three sub-pixels of different colors, at least three of the sub-pixels are respectively a red sub-pixel, a green sub-pixel and a blue sub-pixel arranged in sequence along the first direction;
a first supplementary sub-pixel arranged on a side of a 1-st second pixel set away from a 2-nd second pixel set in the first direction;
a second supplementary sub-pixel arranged on a side of a n-th second pixel set away from a (n−1)-th second pixel set in the first direction; and
a third supplementary sub-pixel arranged on a side of the second supplementary sub-pixel away from the n-th second pixel set in the first direction,
wherein the first supplementary sub-pixel is a blue sub-pixel, and a 1-st first pixel set is constituted by the first supplementary sub-pixel as well as the red sub-pixel and the green sub-pixel in the 1-st second pixel set; and wherein the second supplementary sub-pixel is a red sub-pixel, the third supplementary sub-pixel is a green sub-pixel, and a (n+1)-th first pixel set is constituted by the second supplementary sub-pixel and the third supplementary sub-pixel as well as the blue sub-pixel in the n-th second pixel set, wherein a width of the 1-st second pixel set along the first direction and a width of the n-th second pixel set along the first direction are respectively smaller than a width of each of the 2-nd to (n−1)-th second pixel sets along the first direction;

a sum of the width of the 1-st second pixel set along the first direction and a width of the first supplementary sub-pixel along the first direction is equal to the width of each of the 2-nd to (n−1)-th second pixel sets along the first direction; and a sum of the width of the n-th second pixel set along the first direction, a width of the second supplementary sub-pixel along the first direction and a width of the third supplementary sub-pixel along the first direction is equal to the width of each of the 2-nd to (n−1)-th second pixel sets along the first direction.

2. The pixel structure as claimed in claim 1, wherein each of the plurality of first pixel sets comprises the blue sub-pixel, the red sub-pixel and the green sub-pixels arranged in sequence along the first direction.

3. The pixel structure as claimed in claim 1, wherein each of the plurality of first pixel sets comprises the green sub-pixel, the red sub-pixel and the blue sub-pixel arranged in sequence along the first direction.

4. The pixel structure as claimed in claim 1, wherein the 2-nd to (n−1)-th second pixel sets have the same width along the first direction, the plurality of first pixel sets have the same width along the first direction, and a width of each of the plurality of first pixel sets along the first direction is smaller than a width of each of the 2-nd to (n−1)-th second pixel sets along the first direction.

5. The pixel structure as claimed in claim 4, wherein a ratio of the width of each of the plurality of first pixel sets along the first direction to the width of each of the 2-nd to (n−1)-th second pixel sets along the first direction is n/(n+1).

6. The pixel structure as claimed in claim 1, wherein at least one of the red sub-pixel, the green sub-pixel and the blue sub-pixel in the 1-st second pixel set has a width along the first direction being smaller than a width of the red sub-pixel, the green sub-pixel or the blue sub-pixel in each of the 2-nd to (n−1)-th second pixel sets along the first direction.

7. The pixel structure as claimed in claim 6, wherein the red sub-pixel in the 1-st second pixel set has a width along the first direction being 0.25-0.75 times the width of the red sub-pixel, the green sub-pixel or the blue sub-pixel in each of the 2-nd to (n−1)-th second pixel sets along the first direction; and the blue sub-pixel in the n-th second pixel set has a width along the first direction being 0.25-0.75 times the width of the red sub-pixel, the green sub-pixel or the blue sub-pixel in each of the 2-nd to (n−1)-th second pixel sets along the first direction.

8. A display panel, comprising:
a first substrate;
a second substrate arranged opposite to the second substrate; and
a pixel structure arranged between the first substrate and the second substrate, and comprising:
a plurality of first pixel sets arranged in an array along a first direction and a second direction, each of the plurality of first pixel sets comprising at least three sub-pixels of different colors, and at least three of the sub-pixels being a red sub-pixel, a green sub-pixel and a blue sub-pixel, respectively, wherein between two adjacent first pixel sets, the red sub-pixel in one first pixel set and the blue sub-pixel in another first pixel set adjacent to this first pixel set in the first direction are arranged non-adjacent to each other, and wherein the red sub-pixel and the blue sub-pixel in each first pixel set are arranged adjacent to each other, wherein the pixel structure comprises:
n second pixel sets, each of the n second pixel sets comprising at least three sub-pixels of different colors, at least three of the sub-pixels are respectively a red sub-pixel, a green sub-pixel and a blue sub-pixel arranged in sequence along the first direction;

a first supplementary sub-pixel arranged on a side of a 1-st second pixel set away from a 2-nd second pixel set in the first direction;

a second supplementary sub-pixel arranged on a side of a n-th second pixel set away from a (n−1)-th second pixel set in the first direction; and a third supplementary sub-pixel arranged on a side of the second supplementary sub-pixel away from the n-th second pixel set in the first direction, wherein the first supplementary sub-pixel is a blue sub-pixel, and a 1-st first pixel set is constituted by the first supplementary sub-pixel as well as the red sub-pixel and the green sub-pixel in the 1-st second pixel set; and wherein the second supplementary sub-pixel is a red sub-pixel, the third supplementary sub-pixel is a green sub-pixel, and a (n+1)-th first pixel set is constituted by the second supplementary sub-pixel and the third supplementary sub-pixel as well as the blue sub-pixel in the n-th second pixel set, wherein a width of the 1-st second pixel set along the first direction and a width of the n-th the second pixel set along the first direction are respectively smaller than a width of each of the 2-nd to (n−1)-th second pixel sets along the first direction;

a sum of the width of the 1-st second pixel set along the first direction and a width of the first supplementary sub-pixel along the first direction is equal to the width of each of the 2-nd to (n−1)-th second pixel sets along the first direction; and a sum of the width of the n-th second pixel set along the first direction, a width of the second supplementary sub-pixel along the first direction and a width of the third supplementary sub-pixel along the first direction is equal to the width of each of the 2-nd to (n−1)-th second pixel sets along the first direction.

9. The display panel as claimed in claim 8, wherein each of the plurality of first pixel sets comprises the blue sub-pixel, the red sub-pixel and the green sub-pixels arranged in sequence along the first direction.

10. The display panel as claimed in claim 8, wherein each of the plurality of first pixel sets comprises the green sub-pixel, the red sub-pixel and the blue sub-pixel arranged in sequence along the first direction.

11. The display panel as claimed in claim 8, wherein the 2-nd to (n−1)-th second pixel sets have the same width along the first direction, the plurality of first pixel sets have the same width along the first direction, and a width of each of the plurality of first pixel sets along the first direction is smaller than a width of each of the 2-nd to (n−1)-th second pixel sets along the first direction.

12. The display panel as claimed in claim 11, wherein a ratio of the width of each of the plurality of first pixel sets along the first direction to the width of each of the 2-nd to (n−1)-th second pixel sets along the first direction is n/(n+1).

13. The display panel as claimed in claim 8, wherein at least one of the red sub-pixel, the green sub-pixel and the blue sub-pixel in the 1-st second pixel set has a width along the first direction being smaller than a width of the red sub-pixel, the green sub-pixel or the blue sub-pixel in each of the 2-nd to (n−1)-th second pixel sets along the first direction.

14. The display panel as claimed in claim 13, wherein the red sub-pixel in the 1-st second pixel set has a width along the first direction being 0.25-0.75 times the width of the red sub-pixel, the green sub-pixel or the blue sub-pixel in each of the 2-nd to (n−1)-th second pixel sets along the first direction; and the blue sub-pixel in the n-th the second pixel set has a width along the first direction being 0.25-0.75 times the width of the red sub-pixel, the green sub-pixel or the blue sub-pixel in each of the 2-nd to (n−1)-th second pixel sets along the first direction.

\* \* \* \* \*